Sept. 26, 1961
H. S. PITTMAN
3,001,761
CONDUIT ROD PUSHER
Filed Aug. 22, 1958
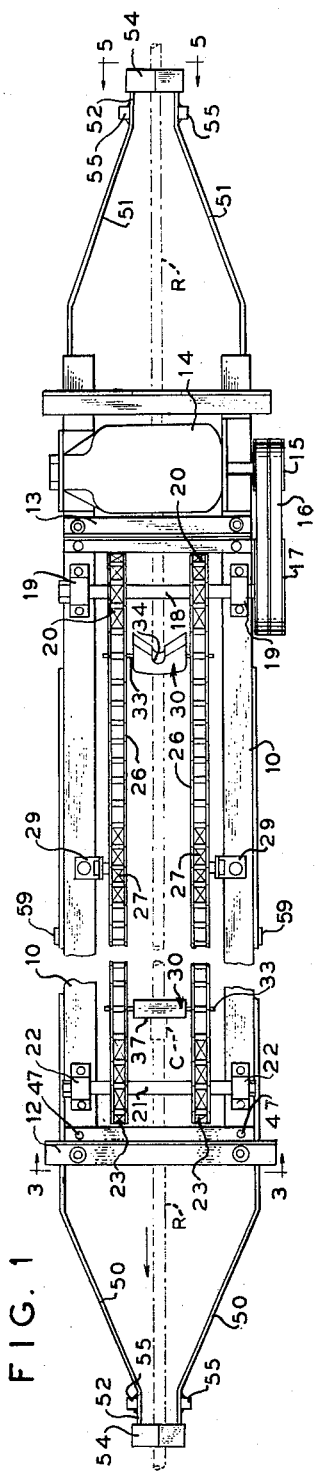
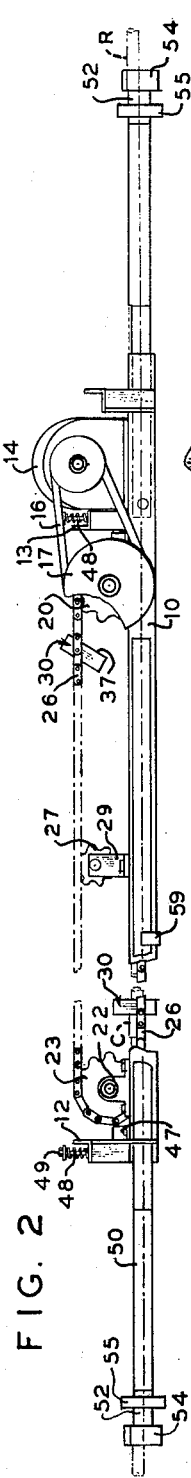
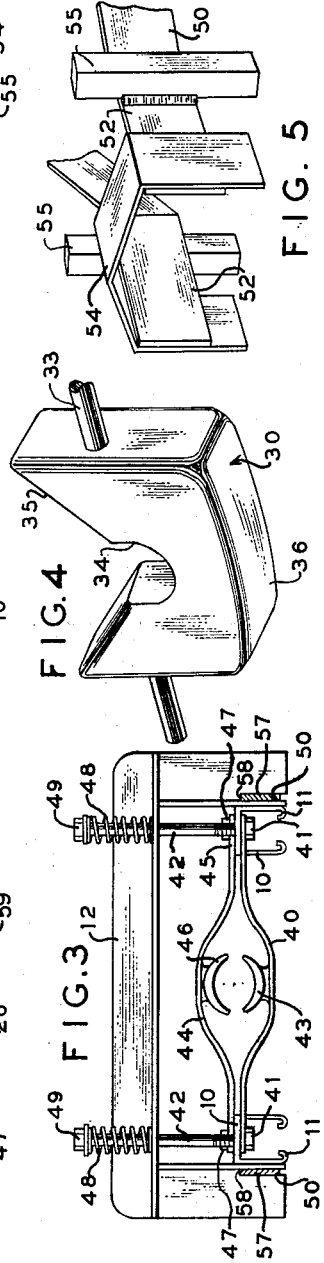
INVENTOR:
HAROLD S. PITTMAN
BY:
ATTORNEY United States Patent Office 3,001,761
Patented Sept. 26, 1961

3,001,761
CONDUIT ROD PUSHER
Harold S. Pittman, Rte. 1, Kenly, N.C., assignor of forty percent to Frank C. Moessner, Jonesboro, Ga.
Filed Aug. 22, 1958, Ser. No. 756,695
3 Claims. (Cl. 254—29)

This invention relates to conduit rod pushers and is particularly concerned with mechanical means for the pushing and/or pulling of rods, pipes, cables, mandrels, or the like through underground conduits.

While certain aspects of the present invention are applicable in the application of power for the movement of a wide variety of rigid or semi-rigid lengths of material both above and below the ground surface, the invention is deemed to have its most effective use in connection with the pulling of telephone wires and power cables through underground conduits. A customary procedure for laying wires and cables in previously installed pipes and conduits includes the step of forcing successively connected lengths of rods, usually formed of wood or aluminum, through the pipe or conduit from one surface juncture, such as a manhole, to the next surface juncture. When the first length of rigid rod has been forced through the conduit to the next adjacent manhole, the wire or cable is attached to the last joint applied at the first manhole. Thereafter the joined rod lengths are drawn forwardly through the conduit, to enter the next successive conduit or to be disjointed and removed. In such movement the wire or cable is drawn through the conduit with the last joint. This expediency is resorted to since it has been found impractical to attempt to force a flexible cable forwardly through a conduit particularly where, in many instances, the conduit may be blocked or clogged with dirt and foreign matter which must be penetrated or pushed from the conduit to accommodate the passage of the cable or wire.

Obviously, such pushing or drawing of the attached rod lengths through the conduit is a time consuming and laborious task. At the present time the operation is almost entirely manual and the number of persons required for the laying of a wire or cable in such manner is considerable. The present invention seeks to relieve the requirement for manual labor in such an operation and to materially reduce the time required by providing mechanical means for applying the requisite force for either pushing or pulling the cable carrying rods through the conduit.

That form of the invention here presented, by way of example, may be generally defined as comprising a mechanism provided with a continuous chain trained about longitudinally spaced sprockets to be driven by a self contained prime mover. Means on the chain provide spaced grippers adapted to engage the rods preferably at successive couplings thereof and to propel the rod through an aligned conduit. It will be understood that such force may be applied either forwardly to push the rods into a conduit or reversely to draw the rods from a conduit after insertion from the opposite end. While such application of force may be continuous with the spacing of the rod engaging members of the chain effective to automatically and successively engage successive rod couplings, the motor is preferably controllable to provide intermittent chain motion to permit pauses for the application or disengagement of successive rod sections.

It therefore will be apparent that it is among the objects of the present invention to provide a novel, simple and improved power means for passing rods, pipes, tubes or equivalent rigid members through conduits or like restricted passages.

It is another object of the present invention to provide automatic means for engaging the successive couplings of rods or pipes for the application of power to force or draw connected lengths thereof through a conduit.

Numerous other objects, features and advantages of the present invention will be apparent from a consideration of the following specification taken in conjunction with the following drawings, in which:

FIG. 1 is a top plan view of one embodiment of the present invention.

FIG. 2 is a side elevation of that form of the invention shown in FIG. 1.

FIG. 3 is a vertical sectional view taken on the line 3—3 of FIG. 1.

FIG. 4 is a detailed perspective view of one of the rods engaging elements carried by the chain of the device, and FIG. 5 is a detailed fragmentary perspective view of one end of the apparatus.

Referring more particularly to the drawings, numeral 10 indicates longitudinally extending side rails of generally inverted U-shaped cross section. As indicated in FIG. 3, the terminal lower edges of the rails 10 are formed with inwardly directed channel forming edges 11. Rails 10 are joined in parallel relationship at their ends by angle iron heads 12 and 13, the heads also being of generally inverted U-shape construction with the lower ends of their vertical legs welded to the outer faces of the rails 10 as indicated in FIG. 3, so as to space the web portions of heads 12 and 13 above rails 10. A prime mover 14, here indicated as an air motor, is mounted transversely on the rails 10. A pulley 15 driven from motor 14 engages belt 16 which is trained over pulley 17 to drive a drive shaft 18. Shaft 18 is rotatably supported parallel to and adjacent the motor 14 by the bearings 19 mounted on the upper face of the rails 10.

Between the rails 10 there is mounted on the shaft 18 a pair of spaced driven sprockets 20, one adjacent each inner face of each rail 10. At the opposite end of the frame formed by the rails 10 and heads 12 and 13, a transverse idler shaft 21 is supported on rails 10 by bearings 22 adjacent the head 12. Idler sprockets 23 are mounted on shaft 21 adjacent the inner faces of the rails 10 and are in alignment with the driven sprockets 20. Over the sprockets 20 and 23 there are trained a pair of parallel continuous chains 26, the upper flights of which are parallel and above the rails 10. The lower flight of chains 26 pass between the rails 10 in approximately the same plane thereof. From this construction it will be seen that upon actuation of the motor 14, shaft 18 will be rotated to move drive sprockets 20 and hence move the chains 26 longitudinally of the frame, the lower flight moving between the rails 10 from the one head towards the other. As indicated at 27, intermediate idler sprockets may be provided, secured by upstanding brackets 29 and extending inwardly from the rails 10 to support the upper flights of the chains 26.

The chains 26 constitute the driving elements of the apparatus by which force is transmitted to rods, pipes, tubes or the like, indicated by the broken lines R. This force is applied in a longitudinal direction centrally of the apparatus and between the rails 10 by means of spaced U-shaped blocks 30. Blocks 30 are preferably so spaced along the chains 26 as to engage each coupling C of rods R. As best seen in FIG. 4, each block 30 is provided with a pair of opposed aligned pintles 33 mounted off center so as to project through and be journalled by links of the respective chains 26 whereby the blocks will hang at an angle such as shown in FIG. 2. It will also be seen that an arcuate or semicircular central notch 34 which opens upwardly to outwardly tapering guide surfaces 35 is provided in block 30. Thus, a substantial portion of the weight of block 30 is below pintles 33.

In the inverted angular position, each of blocks 30 travels with the upper flights of chains 26; however, as the upper flights of chains 26 pass over sprockets 20, there is a tendency for the links of chains 26 to rotate pintles 33 in a clockwise direction and to turn the blocks to which pintles 33 are affixed. Also as blocks 30 approach the rods R, the back face 36 or face 37 will strike one of the rods R behind the coupling C and, with continued travel of chains 26 around the sprockets 20, pintles 33 will be urged downwardly and forwardly to tend to further rotate blocks 30 until the blocks 30 are completely inverted. Therefore, eventually blocks 30 will be moved downwardly sufficiently that one of the rods R will be loosely partially circumscribed by notch 34, the rod being guided by guide surfaces 35.

For guiding the rods R and retaining them in central alignment between the rails 10, there are provided at both ends of the apparatus, downwardly yieldable guide elements, each including a guide strap 40 secured by nuts 41 to the lower end of vertical bolts 42. At the center of each strap 40 there is provided an upwardly curved bearing block 43 on which the rods R are carried as they pass to or from the apparatus. In cooperation with each strap 40, there is an adjacent upper strap 44 arranged in inverted form with its ends 45 rigidly fixed to the rails 10 through the bolt 47 and provided at its center with the downwardly curved bearing block 46. The upper end of the bolts 42 are surrounded by coiled springs 48 urging the bolt head 49 of bolts 42 upwardly. This arrangement is such that while spring tension is applied to the rods R by the lower straps 40, the rods R pass between guides upon approach of a coupling member C, the bolts 42 move downwardly against the tension of the spring 48 to permit the lower strap 40 to recede from the upper strap 44 and allow the coupling C to pass over bearing block 43 and under bearing block 46.

It will be understood that in most applications, the present device is used underground with the frame mounted within the confines of a manhole and between the mouths of previously laid conduits. For supporting the frame a position to be aligned between complementary conduits through which the rods are to be fed, I have provided a pair of supporting yokes, one of which is fixed to the frame at one end thereof and the other of which is secured to the frame so as to be slidable longitudinally toward and away from the frame. The purpose of these yokes is to be engageable and disengageable in the complementary conduits and thereby support the device.

In more detail, the fixed yoke includes a pair of complementary spaced beams 51 which fixed to the outer portions of rails 10 and extend outwardly beyond the ends of rails 10 and then taper inwardly toward each other to terminate in parallel end pieces 52. Similarly, the movable yoke at the other end of the frame includes a pair of complementary beams 50 running parallel to each other adjacent the outer surfaces of rails 10 and through downwardly opening slots 57 in the arms of heads 12 so that the shoulders 58 of slots 57 rest upon beams 50. Intermediate the ends of rails 10 are L-shaped upwardly opening brackets 59 which receive the lower surfaces of beams 50 to thus prevent clockwise rotation of beams 50 as viewed in FIG. 2 and yet permit beams 50 to slide with respect to rails 10. Outwardly of rails 10, beams 50 taper inwardly toward each other and are provided with other parallel end pieces 52 in the same manner that beams 51 are provided with end pieces 52.

Each of the pairs of beams 50 and 51 are provided inverted U-shaped end caps 54 having peaked web portions and vertical sides, the sides being secured to the ends of end pieces 52, as shown in FIG. 5. Respectively affixed to end pieces 52 at the junction of the beams 50 and 51 with their end pieces 52, are stop bars 55 which limit the distance that the ends of the yokes may project into the openings of the conduits.

From the foregoing the operation of the present device should be apparent. After the conduits have been laid to a particular manhole and it is desired to insert a cable or wire through a particular conduit, my apparatus is lowered into the first manhole. Next, the end of the fixed yoke, i.e., the cap 54 affixed to beams 51, is inserted into the mouth of one conduit, and, the device lifted to a horizontal position. Thereafter, the movable yoke is extended so as to insert the other cap 54 into the mouth of the complementary conduit. Thus, my apparatus is supported in a horizontal position, resting between the mouths of two aligned conduits in a manhole. It is important to note that, in the particular embodiment here depicted, no means are provided for locking the movable yoke in place and hence all rods R must be driven in the direction of the arrow in FIG. 1 with the reaction from my apparatus being absorbed by stop bars 55 of the fixed yoke acting against the mouth of its conduit. If it is desired to drive the rods R in a direction opposite the direction of the arrow in FIG. 1, suitable clamps or other locking means should be provided for locking the beams 50 to rails 10. This, however, is apparent to those skilled in the art and hence is not illustrated.

After installation of my apparatus, the first rod of rods R is inserted through the bearings 43 and 46 supported by bar 12 and hence between the end pieces 52 of beams 50, into the conduit. A second rod of rods R is then inserted through the bearings 43 and 46 supported by bar 13 and the end coupled by coupling C to the end of the first rod. Other rods may be coupled in tandem as described above. Motor 14 is then actuated so as to drive belt 16 which drives pulley 17 to rotate shaft 18, thereby rotating sprockets 20 to drive chains 26 in a direction such that the upper flights of chains 26 move from left to right and the lower flights move from right to left in FIG. 1. Therefore, successive blocks 30 will be carried around the sprockets 20 and urged down against the second and successive rods R. As pointed out above, each of blocks 30 is carried at an angle as seen in FIG. 2 by the upper flights of chains 26 and pivots slightly as chains 26 pass around sprockets 20 so that the face 37 of each of blocks 30 is presented to the rod therebeneath. Even if no rotation is imparted to an individual block, the fact that the edge between face 36 and face 37 is lowermost will cause this edge to engage the rod and with continued downward movement of pintles 33, the block 30 would be urged eventually to an inverted position whereby the rod of rods R would be received in the arcuate notch 34. If not properly aligned, block 30 may urge rods R downwardly against spring tension of springs 48. Thereafter, the block 30 is carried along the rod by the lower flight of chains 26 until face 37 engages a coupling C. Upon engagement with a coupling C, the continued movement of the block 30 by the lower flight of chains 26 will urge rods R into the conduit.

As also pointed out above, the distance between successive blocks 30 along chains 26 is greater than the linear distance between successive couplings; hence, each successive block will engage rods R behind successive couplings and slide along a particular rod a short distance before engaging and acting against a coupling C. It is apparent that as each of blocks 30 reaches the end of the lower flight of chains 26 or, in other words, reaches sprockets 23, it is moved upwardly and around the sprockets 23, the block 30 being rotated to its upright position by gravity.

The motor 14 is usually stopped periodically to permit the addition of rods until all rods R are coupled and urged through the conduit. When the last rod has been installed, my machine is disengaged from between the conduits and moved to the next or second manhole where the first group of rods should be projecting into that manhole. My machine is then reinstalled by inserting caps 54 in the mouths of the conduits and by uncoupling a pair of adjacent rods R and inserting them through bearings 43 and 46 below heads 12 and 13. All that need be done now is to actuate motor 14 and the rods R will be driven through the conduit to the next or third manhole. It will be obvious that in some instances where it is impractical to uncouple the rods R, nuts 41 may be removed from bolts 42 so that straps 40 may be removed and my machine inserted over the rods R. Of course, the straps 40 are then replaced before my machine is operated.

From actual tests I have observed my machine push over 1,000 yards of rods through a conduit at a speed of 100 feet per minute. Thus, the work of my machine replaces the work done by a number of men.

It will be obvious to those skilled in the art that many variations may be made in the embodiments chosen for the purpose of illustrating the present invention, without departing from the scope thereof as defined by the appended claims.

I claim:

1. A rod pusher including a frame having a pair of spaced rails, a motor mounted on said frame, a pair of axles mounted transversely on said frame in spaced parallel relationship to each other, means journaling said axles, drive means connected between said motor and one of said axles for rotating the same upon actuation of said motor, a pair of spaced sprockets on said one of said axles, a pair of spaced sprockets on the other of said axles and aligned respectively with the first mentioned pair of sprockets, all of said sprockets being within said frame, a pair of continuous chains trained over said sprockets, one flight of each of said chains being aligned with said rails, rod supporting means carried by said frame for supporting a line of tandem coupled rods in parallel relationship to said one flight of each of said chains, spring means operatively positioned between said frame and said rod supporting means for resiliently resisting movement of said coupled rods outwardly of said frame, a plurality of spaced blocks carried between said chains, the space between successive of said blocks being greater than the space between the couplings of said rods, a fixed yoke at one end of said frame for insertion into the mouth of a conduit, an extensible yoke on the other end of said frame for insertion into the mouth of a conduit aligned with the first mentioned conduit, and bearing means on said fixed yoke for reaction against said first mentioned conduit, said blocks being so constructed and arranged as to engage successive couplings of said rods to urge them toward said extensible yoke upon movement of said blocks by said chains.

2. The structure defined in claim 1 including pintles on said blocks extending outwardly therefrom and journaled by said chains, each of said blocks being provided with an arcuate hole in the central position thereof opening outwardly to receive the rods, said arcuate opening being of a larger size than said rods and smaller in size than the couplings of the rods.

3. A rod pusher including a frame having a pair of spaced rails, a motor mounted on said frame, a pair of axles mounted transversely on said frame in spaced parallel relationship to each other, means journaling said axles, drive means connected between said motor and one of said axles for rotating the same upon actuation of said motor, a pair of space sprockets on said one of said axles, a pair of spaced sprockets on the other of said axles and aligned respectively with the first mentioned pair of sprockets, all of said sprockets being within said frame, a pair of continuous chains trained over said sprockets, one flight of each of said chains being aligned with said rails, rod supporting means carried by said frame for supporting a line of tandem coupled rods in parallel relationship to said one flight of each of said chains, spring means operatively positioned between said frame and said rod supporting means for resiliently resisting movement of said coupled rods outwardly of said frame, a plurality of spaced blocks carried between said chains, a fixed yoke at one end of said frame for insertion into the mouth of a conduit, and bearing means on said fixed yoke for reaction against said first mentioned conduit.

References Cited in the file of this patent
UNITED STATES PATENTS

| | | |
|---|---|---|
| 945,902 | Atleson | Jan. 11, 1910 |
| 1,188,336 | Shurtleff | June 20, 1916 |
| 1,239,875 | Bruce | Sept. 11, 1917 |
| 1,746,221 | Matteson | Feb. 4, 1930 |
| 1,809,342 | Johnson | June 9, 1931 |
| 1,962,466 | Scott et al. | June 12, 1934 |
| 2,133,971 | Christensen et al. | Oct. 25, 1938 |
| 2,286,666 | Briggs | June 16, 1942 |
| 2,544,256 | Ciaccio | Mar. 6, 1951 |
| 2,718,802 | Cook | Sept. 27, 1955 |